Nov. 30, 1937. B. M. LANG 2,100,857
DEVICE AND METHOD FOR ACQUIRING RHYTHM IN STUDY OF MUSIC
Filed May 1, 1935
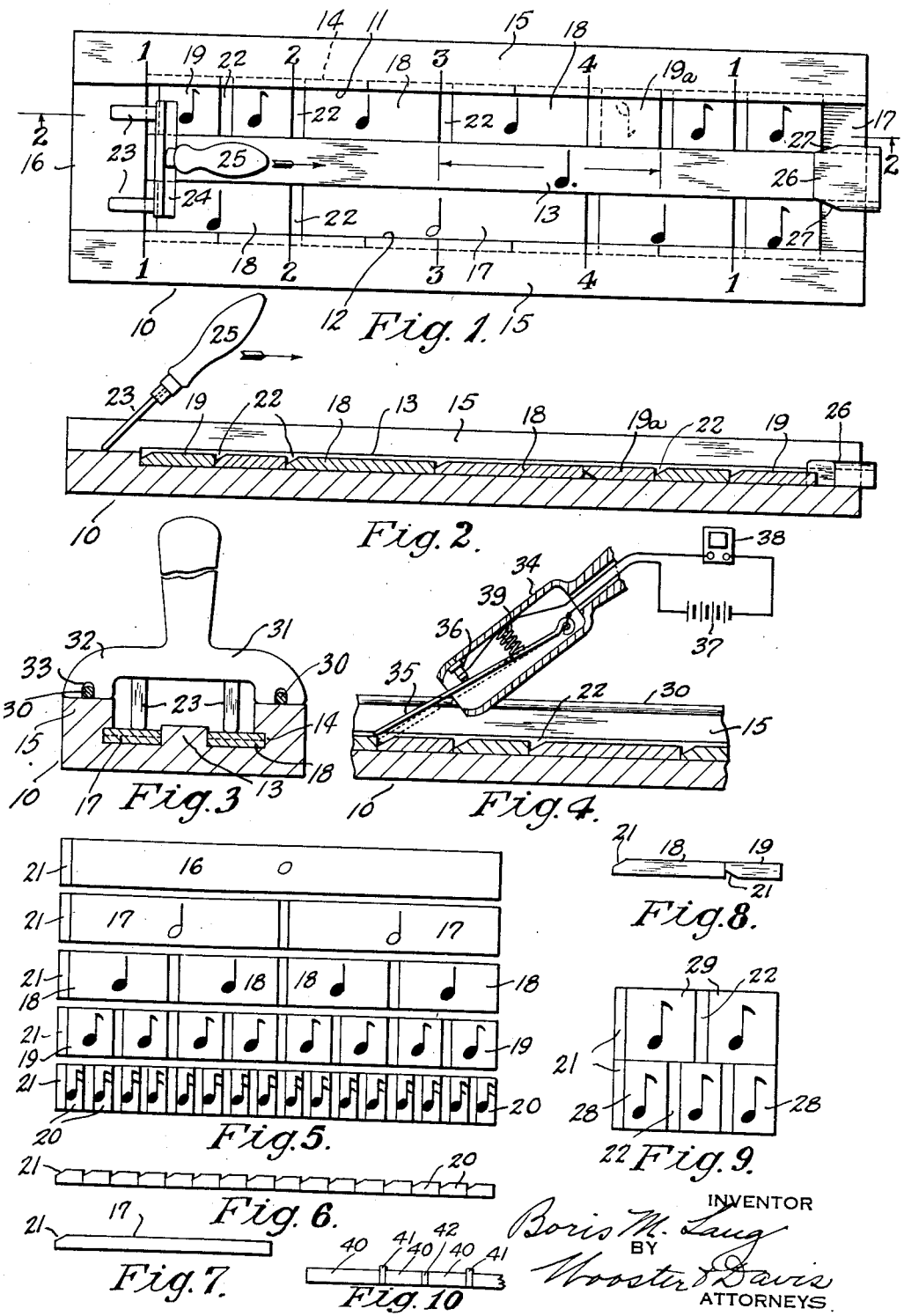

Patented Nov. 30, 1937

2,100,857

UNITED STATES PATENT OFFICE 2,100,857

DEVICE AND METHOD FOR ACQUIRING RHYTHM IN STUDY OF MUSIC

Boris M. Lang, Fairfield, Conn.

Application May 1, 1935, Serial No. 19,204

7 Claims. (Cl. 84—484)

This invention relates to a device for assisting in the acquiring of the proper rhythm in the study of music, and has for an object to provide a simple and effective device whereby notes of particular value in the music can be set up in their proper relation by the student to visibly indicate this relationship and the proper rhythm, and also can be used with a sounding device to audibly give the beats in their correct relative relation to produce the proper rhythm.

In musical education there must be a distinction made between metrical and rhythmical values. The well known instrument the "metronome" serves the purpose of accurate timing of the passage and making it metrically correct, but it does not involve the element of will and active creation of time values upon the part of the student, and also ignores the rich and variable pulse of live rhythm which is present in the actual playing of great artists. In other words the "metronome" when set for any given time gives beats always with uniform spacing. This gives the correct time values but does not give the rhythmic values, which is the object of the present invention, together with the possibility of practicing retardando and accelerando. This device not only gives the rhythm to the sense of hearing but also gives a visible picture of the correct rhythm which corresponds with the way notes are read. In short it teaches the pupil to develop his will and the rhythmical sense for an accurate recreation of rhythm having for a basis the relative lineal measurement of blocks. There is thus a coordination between the mind and movement, or coordination of the movement and time value of the notes with production of the rhythm.

It is therefore the principal object of this invention to provide a simple device for producing these effects and one which may be easily and quickly set up for this purpose.

There are a number of ways in which these results can be accomplished. A simple device and one which is particularly adapted for beginners and small children is shown in the accompanying drawing, in which Fig. 1 is a top plan view of a device illustrating the principle;

Fig. 2 is a longitudinal section substantially on line 2—2 of Fig. 1;

Fig. 3 is a transverse section showing a somewhat modified construction of sounding device;

Fig. 4 is a longitudinal section illustrating the use of the modified sounding element;

Fig. 5 is a top plan view showing a series of blocks which may be used;

Fig. 6 is an edge view thereof;

Fig. 7 is an edge view of one element;

Fig. 8 shows one use of the blocks;

Fig. 9 shows another use; and

Fig. 10 shows a slight modification.

The device shown comprises a frame 10 of any suitable material, such for example as wood provided with a pair of longitudinally extending grooves 11 and 12 separated by a central ridge 13. At one side the grooves 11 and 12 undercut the side walls as indicated at 14. Preferably the side portions 15 of the base on the outer sides of the grooves 11 and 12 are considerably higher than the central ridge 13 although not necessarily so. At one end the grooves are closed by the cross member 16 but are left open at the other end 17 for insertion and removal of blocks representing different notes, a number of which are shown in Fig. 5. These blocks may be made of any suitable material such for example as hardwood or any other material as metal or composition, as desired. These blocks are of the width and depth to fit in the grooves 11 and 12 with an easy sliding fit and are of a length depending on the note which they are to represent. For example the block 16 is of a length to represent a whole note. The blocks 17 are one half the length of the block 16 and therefore represent half notes. Blocks 18 are half the length of blocks 17 and therefore represent quarter notes. In the same manner blocks 19 represent eighth notes and blocks 20 sixteenth notes, etc. I have found that a length of about six inches for a half note is quite satisfactory with of course the lengths of the other notes to correspond, but different basic lengths may be used as found desirable. The sides of the grooves 11 and 12 preferably have a scale representing the note values. That is from 1 to 1 may be a whole note, 1 to 3 a half note, 1 to 2 a quarter note, and half way between 1 and 2 an eighth note and so on. An end of these blocks is beveled as indicated at 21 so that when the blocks are placed end to end in the grooves 11 and 12 in the frame as indicated in Figs. 1 and 2 there will be a transverse recess or groove 22 formed between each two blocks so that when a sounding element, as for example a flexible resilient reed 23 is drawn longitudinally over the blocks there will be a distinct noise as a beat or click as the reed passes over the grooves 22, or that is drops off the vertical end of one block on to the bevel 21 of the next block.

It will be clear that these removable blocks may represent the spacing between the beats of the rhythm. Thus the teacher or the student may set up in the frame 10 by means of the various blocks the notes corresponding to the particular passage being studied and with the two grooves arranged as shown. The upper set of blocks in groove 11 may represent the treble clef while the lower set in the groove 12 may represent the base clef or either set may be used alone if desired, the double arrangement clearly showing the relation between the two, and by using the double reed arrangement shown in Fig. 1 in which the two reeds 23, one for each set of blocks, is mounted on a common support 24 operated by a suitable handle 25, the two reeds can be drawn together to the right over the two sets of blocks and will sound the beats for both sets in proper relation to each other, and sound the proper rhythm. Thus in Fig. 1 by way of example I have shown two eighth notes followed by a quarter note then a dotted quarter note (a quarter note block plus an eighth note block 19 reversed and marked 19a) and two eighth notes. In the lower groove is another arrangement of notes, and it will be evident that with blocks corresponding in length to the time represented by each note any desired combination can be set up. It is evident that as a reed passes over the flat tops of the blocks it is silent, the beats being sounded only as the reed passes over the grooves 22, and with a uniform movement forwardly of the reed the beats will be spaced to correspond with the time represented by each note and therefore the proper rhythm will be sounded by these beats at their proper spacing. It will also be evident that as the grooves 22 and their relation to each other are clearly visible together with the variation in the length of spacing between them, there is also a pictorial illustration of record of the rhythm in the device. It also assists the student in securing a clear idea of the various relations as to time for each note, and the different lengths of blocks gives the child a visual indication of the values of the different notes in reference to each other.

Any suitable means may be provided for holding the set up of blocks in the grooves, that shown in Figs. 1 and 2 comprising a block 26 of inverted U-shape to straddle the rib 13 and provided with beveled side walls 27 to wedge between the edges of the end blocks and the ridge 13 to clamp the blocks in position.

Fig. 8 shows how two blocks may be combined to indicate the length of time for a dotted note or a tie. For example if in this figure the block 18 represents a quarter note and block 19 an eighth note when the blocks are placed in the frame, if the block 19 is reversed it will give a spacing for the two grooves at the opposite ends of the blocks combined to represent a dotted quarter note, or an eighth note tied to a quarter note.

In Fig. 9 is shown how the blocks may be used as at 28 to indicate triplets in relation to a pair of notes indicated by the blocks 29. It will be evident that various other arrangements and combinations may be used and built up with these blocks as desired.

It will be evident that after the blocks are set up in the frame to correspond with the notes of the particular passage, if a stick, a reed, or other sounding instrument is passed longitudinally over the tops of these blocks from left or right at uniform speed as shown by the arrow in Figs. 1 and 2, there will be a click or beat as the reed passes over each groove 22, and as they are spaced according to the beats of the rhythm it will be evident that the rhythm will be produced by this movement. With this device the beats are coordinated in the mind of the student with movement and space. That is, there is a coordination between the mind and movement, or coordination of the movement and time values of the note with production of the rhythm, and involving the exercise of the will of the student in its proper production. In other words it ties up mechanically or gives the proper rhythm in combination with space and movement. The mechanical unit presents the time values (of rhythm) in space, thus making it tangible, visible and subject of will.

Various sounding devices may be used, and structures may be employed to assist in retaining the sounding device in proper location during its movement. Thus as shown in Fig. 3 a guide such as rods 30 may be rigidly mounted on the tops of the side walls 15 and the holder 31 for the reeds 23 be provided with side extensions 32 having grooves 33 to receive the guides. As the device is moved longitudinally over the setup of blocks it will be properly guided by the elements 30.

Instead of depending on the reeds 23 only to give the sound, various electrical devices may be employed either to sound a buzz or beat as it passes over the grooves between the blocks or it may be constructed to give a continuous sound, such as a buzz, as it passes over the flat tops of the blocks with a break in the sound as it passes over the grooves. Thus as shown in Fig. 4 a holder 34 may have a chamber in which is a pivoted reed or member 35 to be drawn along the tops of the blocks and normally engaging an electrical contact 36 to close a circuit from a battery 37 to a buzzer 38, with a spring 39 to shift this member 35 to break or open the circuit as it passes over the grooves between the blocks, or it can be reversed to close the circuit and make the sound as it passes over the grooves. These devices illustrated, however, are shown merely by way of example and it will be evident that different constructions of blocks and means of mounting them can be employed and various forms and types of sounding means may be used with them.

Other means may be provided in place of the bevels or grooves 21 and 22 for producing the beats. Thus for example as shown in Fig. 10 flat blocks 40 may be used and a narrow higher spacer 41 inserted between two adjacent blocks over which the reed passes to produce the beat. If the time for two notes without a beat is desired then a spacer 42 of the same height as the blocks may be used so no beat will be produced.

Having thus set forth the nature of my invention, what I claim is:

1. In a device of the character described, a series of blocks of which different individual blocks are of different relative lengths corresponding to the relative time values of different musical notes, a holder having means to hold a series of these blocks in end to end relation, said blocks having means to provide a break in the continuous surfaces of the blocks at the joints between them, and a sounding device to be moved over the blocks lengthwise thereof and adapted to sound a beat as it passes over a break.

2. In a device of the character described, a series of blocks of which different individual blocks are of different relative lengths corresponding to the relative time values of different musical notes, a holder having a longitudinal guide adapted to receive said blocks in end to end relation and hold them against relative lateral movement, said blocks having a bevel at one end to provide a groove at the joints between adjacent blocks, and a sounding device to be moved over the blocks lengthwise thereof and adapted to sound a beat as it passes over a groove.

3. In a device of the character described, a series of blocks of which different individual blocks are of different relative lengths corresponding to the relative time values of different musical notes, a holder having means to hold two series of these blocks in end to end relation against relative lateral movement and side by side to represent two clefs of a musical score, said blocks having means to provide a break in their continuous surfaces at the joints between them, and a sounding device having independent means movable over the individual series of blocks lengthwise thereof and each adapted to sound a beat as it passes over a break.

4. In a device of the character described, a series of blocks of which different individual blocks are of different relative lengths corresponding to the relative time values of different musical notes, a holder having a pair of parallel guide grooves adapted to receive said blocks in end to end relation, an end of each block being beveled to provide a transverse groove at the joints between the blocks, and a sounding device movable longitudinally over the blocks in the grooves and having a sounding means for each series of blocks adapted to sound a beat as it passes over each groove.

5. In a device of the character described, a series of blocks of which different individual blocks are of different relative lengths corresponding to the relative time values of different musical notes, a holder having means to hold a series of these blocks in end to end relation and against relative lateral movement, said blocks having means to provide a break in the continuous surfaces of the blocks at the joints between them, and a sounding device having a flexible reed adapted to be moved longitudinally over the blocks and sound a beat as it passes over a break.

6. In a device of the character described, a series of blocks of which different individual blocks are of different relative lengths corresponding to the relative time values of different musical notes, a holder having means to hold a series of these blocks in end to end relation and against relative lateral movement, each block having a bevel at one end to provide a groove at the joint between adjacent blocks, and a sounding device having a flexible reed to be moved longitudinally over the blocks and sound a beat as it passes over a groove.

7. In a device of the character described, a series of blocks of which different individual blocks are of different relative lengths corresponding to the relative time values of different musical notes, a holder having means to hold a series of these blocks in end to end relation and against relative lateral movement, said blocks having means to provide a break in the continuous surfaces of the blocks at the joints between them, a sounding device having an element movable longitudinally over the blocks adapted to sound a beat as it passes over a break, and cooperating guide means on the holder and sounding device to guide the sounding device in the proper path during its movement.

BORIS M. LANG.